United States Patent
Boecker et al.

(10) Patent No.: US 11,656,153 B1
(45) Date of Patent: May 23, 2023

(54) SIMULATOR FOR VEHICLE DRIVETRAIN TESTING

(71) Applicant: Zoox, Inc., Foster City, CA (US)

(72) Inventors: Moritz Boecker, Millbrae, CA (US); Thomas Joseph Burrow, Palo Alto, CA (US); Ryan O'Leary Flatland, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 10 days.

(21) Appl. No.: 17/399,870

(22) Filed: Aug. 11, 2021

(51) Int. Cl.
*G01M 17/007* (2006.01)
*G01L 5/13* (2006.01)

(52) U.S. Cl.
CPC ............ *G01M 17/007* (2013.01); *G01L 5/13* (2013.01)

(58) Field of Classification Search
CPC ................................ G01L 5/13; G01M 17/007
See application file for complete search history.

(56) References Cited

U.S. PATENT DOCUMENTS

| | | | |
|---|---|---|---|
| 10,589,738 B1* | 3/2020 | Boecker | B60W 10/18 |
| 11,136,021 B1* | 10/2021 | Funke | B62D 7/159 |
| 2010/0324766 A1* | 12/2010 | Linda | B60W 40/076 701/22 |
| 2019/0310162 A1* | 10/2019 | Pfeiffer | G01M 17/0072 |
| 2020/0180448 A1* | 6/2020 | Boecker | H02J 7/0029 |
| 2020/0249127 A1* | 8/2020 | Bauer | G01P 15/00 |
| 2021/0231527 A1* | 7/2021 | Pfister | G01M 13/02 |

* cited by examiner

*Primary Examiner* — Eric S. McCall
(74) *Attorney, Agent, or Firm* — EIP US LLP

(57) ABSTRACT

Aspects of the invention relate to a method comprising: determining an output torque at a wheel of a vehicle mounted to a test apparatus comprising an external motor, the output torque being in response to a command; determining a correction factor based on the output torque and at least one coefficient associated with a reaction of a component of the vehicle and/or of the test apparatus to an applied torque at the vehicle; and controlling the external motor to apply the correction factor to the wheel of the vehicle.

18 Claims, 5 Drawing Sheets

US 11,656,153 B1

SIMULATOR FOR VEHICLE DRIVETRAIN TESTING

BACKGROUND

Prior to being used on real roads, vehicles may be tested to ensure that they are suitable for use on real roads. For example, vehicles may be tested in virtual conditions, using computer modelling to model the vehicle and the environment in which it is travelling. Physical test vehicles may be tested in controlled conditions on outdoor or interior test roads. Physical test vehicles may also be tested on simulation equipment or apparatus, whereby the vehicle is mounted on the apparatus and the apparatus simulates driving conditions that the vehicle may experience.

BRIEF DESCRIPTION OF DRAWINGS

The detailed description is described with reference to the accompanying FIGS.. The use of the same reference numbers in different FIGS. indicates similar or identical components or features.

DETAILED DESCRIPTION

Figure 1:
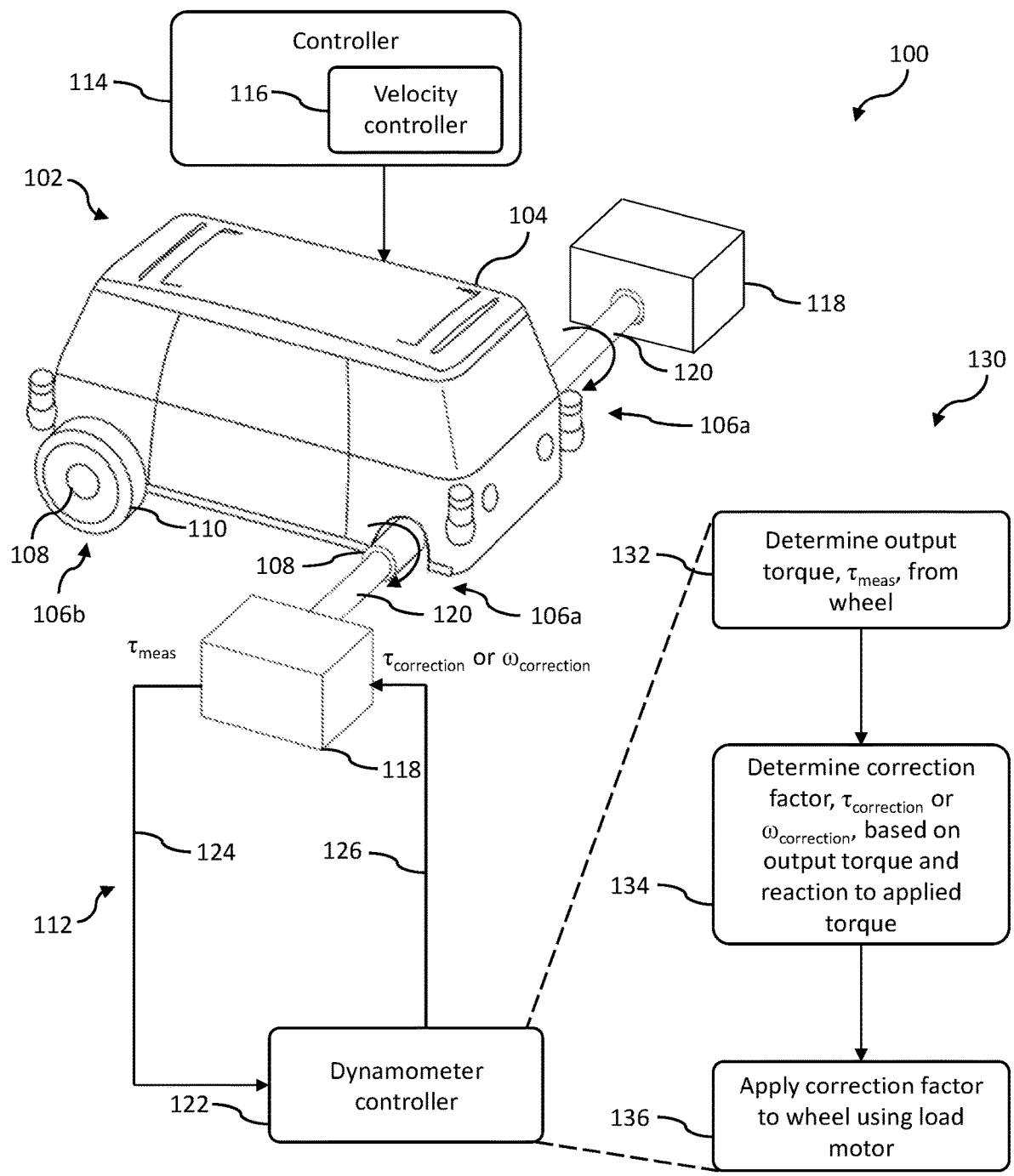
FIG. 1 is a pictorial diagram of a vehicle mounted to test apparatus for simulating road conditions and a process for controlling the test apparatus.

The application relates to improvements in testing vehicles, particularly self-driving vehicles. Testing a vehicle may including mounting the vehicle to test apparatus (e.g., motors, rollers, etc.) for simulating driving conditions that the vehicle may encounter while traversing an environment. The vehicle may be mounted to the test apparatus at wheels, hubs, or other drivetrain or powertrain components of the vehicle. The test apparatus may impart forces to the vehicle's drivetrain to simulate road conditions. The forces imparted by the test apparatus may also be imparted to components of a chassis system of the vehicle, such as the brakes of the vehicle. References to the drivetrain below are intended to encompass brakes and other components to which forces from the test apparatus may be applied. When the vehicle is mounted to the test apparatus, the vehicle remains at the same spatial position, while the wheels and drivetrain components are permitted to rotate. When a vehicle is mounted to such test apparatus, the combination of the vehicle and test apparatus can have different properties to that of a vehicle driving on a road. The operation of some vehicle components may be altered in order to mount the vehicle to the test apparatus. Components of the test apparatus may be connected to the vehicle as part of the mounting, and their presence may alter the properties of the parts of the vehicle to which they are connected. The different properties may lead to a difference in how the vehicle reacts to acceleration, velocity, and/or steering commands from a controller, for example. The methods and systems described herein can compensate for, or otherwise counteract, at least some of these different properties by, for example, determining and adjusting for changes in the operation of components of the vehicle due to the vehicle being mounted to the test apparatus. Specifically, the methods and systems are provided based on the important realization that stiffness and damping properties, among others, differ when the vehicle is mounted to test apparatus compared to the vehicle operating on a real road. In these methods and systems, a vehicle can be controlled when mounted to test apparatus according to a drive control signal and the test apparatus can be controlled according to a compensation control signal to counteract the effects of stiffness and/or damping that arise due to the vehicle being mounted to the test apparatus. In other words, the compensation control signal may be configured to counteract stiffnesses and/or damping arising from differences between the test vehicle mounted to the test apparatus and a vehicle configured for travel on real roads. The compensation control signal can be applied as a corrective torque value or a corrective velocity value by the test apparatus. This compensation control signal can ensure that stiffness and damping effects are compensated for, without affecting the operation of the test vehicle. This can be important in test scenarios where the vehicle is controlled by autonomously or semi-autonomously, as the control can be as close to normal operation as possible, without the effects that are associated with the test apparatus.

FIG. 1 shows a pictorial representation of a system 100. The system 100 includes a vehicle 102. The vehicle 102 is illustrated as a test vehicle. By test vehicle it is meant that the vehicle may be a vehicle that has been adapted from a vehicle configured to travel on roads to a vehicle configured for mounting to test apparatus. The vehicle may be adapted with adaptations or modifications to make it suitable for testing while mounted to the test apparatus. As shown in FIG. 1, the vehicle 102 has a vehicle body 104 typically supported on four wheels 106, only two of which can be seen in the perspective view of FIG. 1. The wheels 106 may each comprise a wheel hub, referred to generally with the number 108 in FIG. 1, to which a tire 110 may be mounted. For ease of explanation, the wheels at the end of the vehicle in the foreground of FIG. 1 will be referred to as the front wheels 106a, while the wheels at the other end of the vehicle in the background will be referred to as the back wheels 106b. However, in some examples the vehicle 102 may be a bi-directional vehicle, such that either pair of wheels 106a or 106b may be the front wheels. Furthermore, for the purposes of FIG. 1, it is assumed that only the front wheels 106a are driven, as will be explained below, but in other examples any of the wheels 106 may be driven. Any suitable mechanism may be used to drive the wheels as will also be explained below.

In the diagram of FIG. 1, a tire 110 is mounted on each of the rear wheels 106b, while the front wheels 106a are connected to test apparatus, represented generally by 112, for the purposes of testing the vehicle. Accordingly, some components that would be present on a vehicle configured to travel on roads may have been removed such as, as illustrated in FIG. 1, the tires of the front wheels 106a. The lack of these components facilitates connection between the test apparatus and the vehicle. In some embodiments, these components may still be present but their operation may be altered by the presence of the test apparatus. For example, a tire may be present on all wheels and may rotate with the wheel hubs 108 but may not be in contact with a surface, meaning that certain stiffness and damping effects associated with the tires are not experienced by the vehicle.

In the system 100 of FIG. 1, the front wheels 106a are driven, while the rear wheels 106b to which the tires 110 are mounted are not driven. Wheels may be driven via a drivetrain. The drivetrain may comprise a motor, which may be an electric motor, an internal combustion engine, or another type of motor capable of applying motive force to rotate the wheels of the vehicle. The drivetrain may comprise a transmission to rotate the wheels or may be a direct drive system. Other suitable drivetrain configurations may also be used to drive the wheels of the vehicle. For the purposes of this application, wheels driven by a motor of the vehicle may be referred to as driven or drive wheels. Each driven wheel may be driven independently by a motor. Each wheel may have its own respective motor. Alternatively, driven wheels may be controlled by a motor shared with one or more other driven wheels.

The vehicle 102 may comprise other components that are not shown in FIG. 1 such as, for example, a brake for each wheel, a suspension system comprising suspension elements connected to each wheel, and other connectors to enable connection of the wheels and the vehicle body. Generally, applying a braking force to the wheels may be achieved using the brakes and/or may be partially achieved by a braking force from the motor(s). If the motor(s) is an electric motor, the braking force may comprise a regenerative braking force.

It will be appreciated that the system 100 of FIG. 1 is for example purposes only. A vehicle, such as the vehicle 102, may be connected to test apparatus by any of its wheels. For example, in a two-wheel-drive vehicle, the driven wheels may be connected to the test apparatus while the non-driven wheels are kept stationary. In a four-wheel-drive vehicle, each of the wheels may be connected to the test apparatus. Accordingly, the concepts described herein relate to four- and two-wheel-drive vehicles, and to other vehicles having different numbers of driven wheels or different numbers of wheels in general.

Similarly, references to the front and rear wheels 106a, 106b are made relative to the FIG. only. In some examples, the vehicle may comprise a rear-wheel drive vehicle such that the wheels connected to the test apparatus are the rear wheels, or the vehicle may be a bidirectional vehicle such that the front and rear wheels are relative to the current direction of travel. To aid clarity, the wheels that are driven by the motor of the vehicle and connected to the test apparatus will be referred to as the drive wheels below.

Returning to FIG. 1, the vehicle 102 is shown to have a controller 114. In some embodiments, the vehicle 102 may be a self-driving vehicle, and the controller 114 may be configured to control the vehicle 102 based on inputs received from one or more sensors (not shown) of the vehicle or other input data. Self-driving vehicles may also be referred to as autonomous vehicles. The controller 114 may comprise a velocity controller 116 to control the velocity of the vehicle 102. The velocity controller 116 may be configured to control the vehicle 102, particularly the motor(s) and brakes of the vehicle, to execute an input velocity command at the drive wheels 106a. Alternatively, an input torque command may be received. The input velocity command specifies a velocity or velocity profile according to which the vehicle is to be controlled. The input velocity command and/or the velocity to which it relates may be determined by the velocity controller 116. In some examples, the input velocity command may be received by the velocity controller 116 from another module of the controller 114 or from an external source. The velocity command and/or the velocity to which the input command relates may be determined based on received sensor input and data from other computation modules within the controller 114.

The velocity controller 116 controls the motor(s) and brakes to execute the input velocity command, and to thereby achieve the velocity to which the velocity command relates. To control the motor(s) to execute the velocity command, a torque command may be output from the velocity controller 116 that corresponds to the input velocity command. The velocity controller 116 determines, based on sensor inputs and/or other data available to it, the output torque command that, when implemented by the motor(s) and/or brakes, will cause the vehicle to move at the velocity specified by the input velocity command. The velocity controller 116 determines the output torque command based on properties of the vehicle. The velocity controller 116 may be specifically tuned to determine the output torque command for the vehicle travelling on a road, including gains and feed-forward terms that adaptively adjust the output commands to execute the input velocity command. The velocity controller 116 may be configured to implement a fast response and a low error between the achieved velocity and the input velocity command. Active suspension may also be used to control the output torque, and may be taken into account in later calculations relating to the correction factor.

The velocity command may be a velocity value or a velocity profile. A velocity value may represent an input value, thereby leading to a step change in the velocity according to which the vehicle is controlled. A velocity profile comprises a plurality of velocity values and temporal information, such that each value is implemented at a particular point in time. In some examples, the velocity controller may receive the individual values that correspond to a velocity profile at the designated point in time and control the vehicle according to the received inputs. Alternatively, the velocity controller 116 may receive a full profile or trajectory velocity command, i.e., a time series of velocities, from which it determines the individual velocities and controls the vehicle accordingly. In some embodiments, the velocity controller may receive input relating to a torque value or profile and may apply the torque value or profile.

In some embodiments, the controller 114 may be an external controller, for example when the vehicle 102 may be a manual vehicle or a self-driving vehicle with manual control capabilities. The controller 114 may interact with a vehicle processor to control the motor or engine and to utilize sensors and other monitoring modules to determine performance of the vehicle.

The drive wheels 106a of the vehicle 102 are illustrated in FIG. 1 as being connected to test apparatus 112. The test apparatus 112 may comprise a load source, which in FIG. 1 comprises a test motor 118, connected to each drive wheel 106a. The load source may comprise any mechanical load for applying a varying torque to a wheel of the vehicle. In other examples, the load source may comprise one or more of an electric motor, a hydraulic motor or pump, a water brake, a conductive eddy current disc, or a flywheel mass. The test motors 118 may be connected to the wheel at the wheel hub 108 of the wheel 106a. The test motors 118 may be connected to their respective wheels 106a by a coupling 120. The coupling 120 may include one or more shafts that extend between the test motor 118 and wheel 106a, one or more connectors to fix the wheel 106a and shafts together, as well as other couplers or adapters, so that rotational torque applied to the drive wheel 106a by a motor of the vehicle 102 is transferred through the connectors, couplers, and adapters to rotate the shafts. The test motors 118 may also apply torque to their respective shafts to simulate road conditions and/or compensate for the influence of the test apparatus 112 on the operation of the vehicle 102, as will be explained below.

While the test motors 118 of the example of FIG. 1 are depicted as being connected to the wheels 106a at their hubs 108, it will be appreciated that the test motors may be connected to other points in the drivetrain of the vehicle to test the vehicle The test apparatus 112 may also comprises one or more sensors (not shown) to monitor the operation of the vehicle 102 during testing of the vehicle. The one or more sensors may be configured to monitor one or more of: a velocity of the wheel; an output torque from the wheels; a force applied by the wheel on the shaft; a torsion or bending of the shaft; absolute angular position of the wheel; or other measurable parameters associated with the rotation of the drive wheels 106a.

The coupling 120 may be connected directly to its respective drive wheel 106a. To be connected to the wheel 106a, parts of the vehicle 102 are removed and/or their operation altered. For example, in FIG. 1, the tires of the drive wheels 106a are not present, and the coupling 120 is connected directly to the hub of the drive wheel 106a. In other examples, the coupling 120 may be connected to the drive wheel 106a through other components of the drivetrain. In some examples, the coupling 120 may be connected to a wheel hub 108 of the wheel 106a, and the wheel 106a may also comprise a tire 110, that is configured not to make contact with a surface when it rotates.

The presence of the test apparatus 112, and particularly the coupling 120, may cause a change in the operation of the vehicle 102, and particularly in the operation of each drive wheel 106a. Ideally, the vehicle 102 and the conditions in which it is operated when connected to the test apparatus 112 would be the same as conditions when the vehicle 102 is travelling on the road. In other words, test conditions should be as close to real conditions as possible. However, the change in operation of parts of the vehicle 102 such as tires to accommodate the test apparatus 112 and the addition of extra components in the coupling and test motor may result in test conditions that are different to real conditions.

As indicated above the velocity controller 116 may provide an output torque command that is suited to real conditions in which the vehicle is operating on a road. As the test apparatus and road differ, when the vehicle is mounted on the test apparatus, the output torque command and the resulting output torque at the wheels of the vehicle may not result in the desired velocity because of the influence of the test apparatus 112.

This difference in output velocity compared to expected velocity for a given torque command may be caused by the properties of the missing components and the properties of the test apparatus components. Particularly, for example, where the test vehicle lacks components that would otherwise be present on a vehicle configured for travelling on roads, in order to facilitate the mounting of the vehicle to the test apparatus, the mass of the wheel may be reduced compared to a wheel of the vehicle configured for travelling on roads. Additional mass may also be present in the form of the coupling and other masses connected to the coupling within the test motor. Furthermore, the coupling, the missing components of the vehicle, and other vehicle components that, when the vehicle is travelling, react to the motion of the vehicle may have different material properties and therefore may have different reactions to an applied torque. The shafts and connectors of the coupling 120 that connect the test motor to the wheel 106a may twist or flex when subjected to rotational force. For example, the shafts and connectors may not be perfectly rigid. Similarly, there may be some movement in the connectors, which may lead to a lag in the transmission of the torque along the shaft. The missing tires also have an associated reaction to rotational force that may not be present when the vehicle is mounted on the test apparatus. Furthermore, stiffness and/or damping effects that are reactions to movement of the vehicle, such as may occur in components such as the suspension system of the vehicle may be reduced in magnitude because the vehicle body is kept stationary while the wheels 106a are connected to the test apparatus 112. These reactions to rotational force or the movement of the vehicle, which are associated with stiffness and damping coefficients of the components, among other parameters, cause the wheels to act differently in response to an applied torque. The velocity controller 116 may therefore also act differently because of these changes, and may not accurately replicate the operation of the vehicle 102 when on the road. In some examples, the velocity controller 116 may be a closed-loop controller and may receive feedback that causes it to react to the applied torques.

Figure 2:
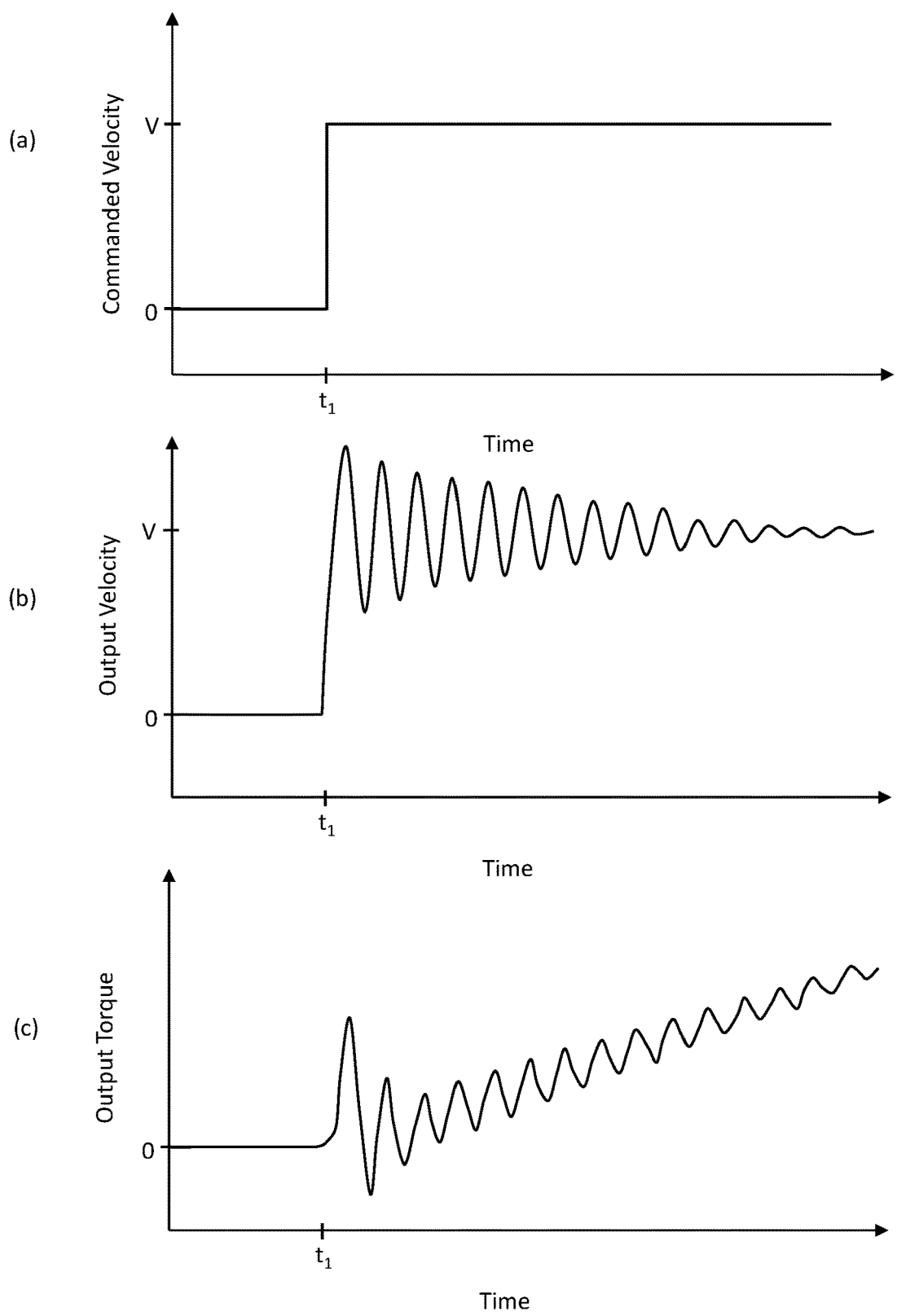
FIG. 2 is a pair of graphs showing a velocity input to a vehicle controller and an output torque of a vehicle measured at test apparatus to which the vehicle is mounted.

In some situations, such as is shown in FIG. 2, it may be observed that the changes due to test apparatus components and/or vehicle components whose operation has been changed may cause unwanted oscillations in the velocity of the wheels 106a. This is because the velocity controller 116, acting in response to a velocity step change, controls the wheel 106a as if the tires are present, as if the vehicle were moving in the commanded direction, and as if there were no connection to the test apparatus. An example of a commanded step change in velocity is shown in the uppermost graph, (a), of FIG. 2, in which commanded velocity is shown on the y axis and time on the x axis. At time $t_1$, the commanded velocity changes from 0 to V.

When the commanded velocity in graph (a) is applied to a vehicle adapted for travelling on a road, the vehicle may be expected to accelerate smoothly to the commanded velocity and maintain the commanded velocity. However, because the components of the test apparatus are present and/or the operation of certain components of the vehicle is changed by the vehicle being mounted to the test apparatus in the example system 100 of FIG. 1, controlling the wheels 106a to achieve the commanded velocity may cause an oscillation in the observed velocity, an example of which can be seen in the middle graph, (b), of FIG. 2. This may be because the velocity controller 116 applies torque according to the stiffnesses and damping of components of the vehicle and the expected reactions of those components of the vehicle when the vehicle is adapted for travelling on a road, and is not mounted to the test apparatus. In response, the velocity controller 116 may repeatedly command acceleration from the motor and then apply the brakes of the vehicle, as shown in graph (b). This oscillation, which may be referred to as 'brake tapping' is undesirable, as it does not reflect how the vehicle would act in a real situation. In some embodiments, this oscillation may carry on when the commanded velocity has been achieved, manifesting in an under- and over-shoot of the commanded velocity.

The oscillating velocity output may appear as an oscillating torque output from each wheel, as shown in the example of the lower graph, (c), of FIG. 2. It can be seen here that the output torque oscillates in a similar manner to the velocity. In other examples, the output velocity and output torque may oscillate differently to what is shown in FIG. 2 because of the relative masses and stiffnesses of the components.

Returning to FIG. 1, to avoid unwanted velocity effects caused by the presence of the test apparatus and to better emulate a vehicle adapted for travelling on a road and to better emulate a real road surface, the test apparatus 112 includes a test apparatus controller 122. The test apparatus controller 122 is configured to determine a correction factor to apply to each wheel 106a via the coupling 120 using the test motor 118. The correction factor is determined in order to account for or to counteract the effects caused by the differences between a vehicle adapted for roads and the vehicle mounted to the test apparatus. The correction factor may comprise or may be in addition to other compensation or varying torque or velocity factors applied by the test motors 118.

The test apparatus controller 122 performs a process 130 for each wheel 106a. In the process 130, at a first step 132, the test apparatus controller 122 determines an output torque, $\tau_{meas}$, from the wheel 106a of the vehicle in response to the velocity command V. Output torque may be determined directly using a strain sensor and/or may be derived or estimated from other measurements. In some examples, the output torque may be estimated based on a stator current in the test motor.

In FIG. 1, the output torque is shown as being the output torque of the wheel 106a, more specifically from the wheel hub 108, measured at one or more sensors of the test apparatus 112, and is indicated by the arrow 124. In some embodiments, the output torque may be received from the controller 114 of the vehicle 102. In some embodiments, the output torque may be calculated based on a velocity command provided to the velocity controller 116. The output torque may be determined based on previous measurements for the same velocity command. The output torque may be modelled based on a model of the vehicle or parts of the vehicle.

The output torque may be determined while the test apparatus 112 is implementing a torque or velocity command at the coupling 120 using the test motor 118. For example, the test apparatus 112 may be configured to command that a load factor, comprising a torque or velocity command, is implemented that represents a condition experienced by the vehicle, such as a road condition, a vehicle condition, or a vehicle load. The load factor may therefore be considered to simulate conditions that may be experienced by the vehicle in real testing conditions. A road condition may comprise a road surface type, a road surface quality, one or more weather conditions causing a change in the road surface, or a gradient of the road. A vehicle condition may comprise wear on a vehicle component such as the tires, or a component type. A vehicle load may include a passenger mass, drag force on the vehicle body, the effects of wind on the vehicle body, changes in the aerodynamics of the vehicle body, or other external influences on the vehicle's movement.

. In addition to or as an alternative to the load factor, the test apparatus 112 may be configured to apply a mass compensation factor using the test motor 118. A mass compensation factor may be implemented as a velocity command or a torque command. The mass compensation factor may account for the changes in mass due to the removal of the tires, where appropriate, and the connection of the wheel 106a to the coupling 120. As already indicated above, the tires each have an associated mass that may be removed to accommodate the coupling 120 of the test apparatus 112. Additional mass is also applied to the wheel by the connectors and shaft of the coupling 120. Because of these changes in mass and changes in how the mass is distributed relative to the motor of the vehicle 102 and the wheel 106a, the torque response of the wheel 106a may change. Particularly, the moment of inertia of the wheel 106a, or more specifically the wheel 106a and coupling combination, may be altered, meaning that a different torque is required to be applied by a motor of the vehicle to rotate the wheel 106a. Accordingly, a mass compensation factor may be implemented by the test motor 118 to compensate for this change.

The load factor and mass compensation factor may be predetermined based on data that has been measured or is known about the components causing the change in mass. These factors may be applied by the test motor 118 as a single command during part or all of the process 130 shown in FIG. 1. In some examples, the load factor and mass compensation factor may be included in the output torque value. In other words, the output torque may be adjusted to compensate for the different masses of the vehicle and test apparatus from a vehicle that is adapted for travel on a road, and/or the output torque may be adjusted for a specific set of load conditions. By adjusting the output torque in this way, the changes due to stiffnesses and damping of the components of the test apparatus and/or vehicle are influencing the output torque when compared to a vehicle adapted for road travel, and so may be determined based on a comparison of the output torque with an expected output torque. In some embodiments, the output torque may be applied without other factors being applied by the test motor 118 so that an output torque is determined when no load factor or compensation factor is applied.

Considering the process 130 of FIG. 1 again, based on the output torque of the wheel 106a at step 132, a correction factor, $\tau_{correction}$ or $\omega_{correction}$ depending on whether the correction factor is implemented as a torque or a velocity command respectively, is determined. The correction factor may be referred to as a torque correction factor to distinguish from the mass compensation factor and load factor.

The correction factor is determined to provide correction for the output torque based on the output torque and at least a coefficient associated with a reaction a component of the vehicle and/or test apparatus to an applied torque at the vehicle. As described above, the component may be a component added or removed by mounting the vehicle to the test apparatus or a component whose operation has been altered due to the mounting the vehicle to the test apparatus. The component may therefore be described as a component in the test apparatus-vehicle setup whose operation is different compared to a vehicle adapted for travel on a road. The components of the vehicle may be one of the missing or inoperative vehicle components affected by the test apparatus, such as the tires. The one or more components may comprise the components of the coupling 120. For example, in reaction to the output torque, the coupling may twist along its length in line with its stiffness coefficient. The tires that are missing from the vehicle may have associated stiffness and damping coefficients that change the reaction of the vehicle to an applied torque when present on the vehicle compared to when the vehicle is mounted to the test apparatus.

In step 134, with knowledge of how the components of the vehicle that have been removed or the components of the coupling react to applied torque, as quantified by their stiffness or damping coefficient or otherwise, the effect of that reaction can be determined relative to the output torque of the vehicle and a correction factor derived.

The stiffness and/or damping may be predetermined based on real-world measurements or based on simulations of the components. To derive stiffnesses experimentally, a known torque may be applied and a displacement of the component may be determined. To determine stiffnesses or damping based on simulations, components of the vehicle such as a tire and suspension may be modelled as a mass-spring-damper system, from which the stiffnesses and damping of the components may be determined. In some embodiments, finite-element analysis may be used to model the components and their relative reactions to rotation.

In some embodiments, an aggregate stiffness, which may be referred to and modelled as a spring constant K, may be determined for the vehicle and test apparatus. This may also be determined experimentally or by simulation. Experiments may be performed by applying a known torque at the vehicle or test motor and determining a displacement of the components of the coupling and wheel to enable a stiffness or spring constant to be derived. An aggregate spring constant may also be determined based on a polar moment of inertia J, a modulus of rigidity G, and a length L, of the components for which the aggregate spring constant is being determined using the following equation:

$$K = \frac{J \cdot G}{L}$$

In some embodiments, the coupling and wheels may be modelled as a plurality of springs in series, such that the spring constants may be determined individually, as $K_1$ to $K_n$. An overall spring constant, $K_{total}$, may be determined by summing the spring constants of components that are present and differ from a vehicle adapted for road travel, such as the coupling and components of the test motor, and by subtracting the spring constants of components of the vehicle that are different because of the vehicle being mounted to the test apparatus. The overall spring constant may be determined using the following equation:

$$\frac{1}{K_{total}} = \frac{1}{K_1} \pm \frac{1}{K_2} \ldots \pm \frac{1}{K_n}$$

In some embodiments, a spring constant for one or more components may be determined for a plurality of different torques and a torque-spring constant relationship may be determined. The correction factor may be determined based on this relationship, for example, using a look-up table to determine a spring constant corresponding to an output torque, determining a correction factor based on the spring constant of the or each component, and controlling the test motor to apply the correction factor.

The overall or aggregate spring constant or stiffness of the components may be used to determine an angular velocity associated with the reaction of these components to applied torque. For example, this may be based on an assumption that acceleration of the components causes a displacement of these components. The displacement of the wheel when connected to the test apparatus, $\theta_{wheel}$, may therefore be expressed in terms of a displacement at the test apparatus, $\theta_{test}$, and a displacement of the components that react to the applied torque, $\theta_{components}$. The displacement of the components includes the new components of the test apparatus, the components whose operation is changed, and the components that are not present on the vehicle. The displacement may therefore be expressed as follows:

$$\theta_{wheel} = \theta_{test} + \theta_{components}$$

From the displacement of the components, an angular velocity may be determined to determine how to control the test motors. Based on the displacement, $\theta_{components}$, corresponding to the measured torque, $\tau_{meas}$, divided by the overall spring constant, $K_{total}$, and that an angular velocity is rate of change of displacement, a corrective angular velocity, also referred to as a velocity correction factor or value, $\omega_{correction}$, may be determined as:

$$\omega_{correction} = \frac{\tau_{meas}}{K_{total}}$$

The velocity correction factor may be applied as the correction factor as a velocity command applied at the test motor. The velocity correction factor may be combined with other measured and determined angular velocities to provide an overall velocity command to a test motor, as will be described in relation to FIG. 3 below. Alternatively, the velocity correction factor may be converted to a torque command for the test motor.

In other embodiments, the correction factor may be a torque correction factor When considering rotation, based on the $2^{nd}$ law of motion, torque of a rotating object is equal to rotational inertia, I, multiplied by angular acceleration, $\alpha$, of the rotating object:

$$\tau = I\alpha$$

The angular acceleration can be represented as change of angular velocity, $\Delta\omega$, over a change in time $\Delta t$:

$$\tau = I\frac{\Delta\omega}{\Delta t}$$

When applied to the present scenario, the torque may be considered to be the torque of a wheel of the vehicle connected to a shaft of the test apparatus. Therefore, the rotating object is the combined shaft and wheel, and any other rotating components attached thereto. If we initially consider the above equation without a correction factor applied, we can equate the torque to three different terms and rearrange as follows:

$$\Delta\omega = \frac{(\tau_{meas} - \tau_{load} - \tau_{mass})}{I}\Delta t$$

In this equation, $\tau_{meas}$ is the measured output torque from the wheel, $\tau_{load}$ is the load torque applied by the test apparatus and $\tau_{mass}$ is the mass compensation torque as described above.

When a correction factor is introduced, this may be as an additional damping term $\tau_{correct}$, such that:

$$\Delta\omega = \frac{(\tau_{meas} - \tau_{load} - \tau_{mass} - \tau_{correction})}{I}\Delta t$$

Alternatively, the correction factor may be introduced as one or more coefficients or weightings, or a combination of these, to compensate for differing effects.

Example control systems are discussed later in relation to both a velocity correction factor and a torque correction factor.

In some embodiments, the reaction to rotation on which the torque correction is based may comprise other parameters. For example, there may be some movement in the connection between the wheel and the coupling, such that the coupling and wheel slip relative to one another when a force is applied that overcomes the coefficient of friction in the connection.

At step 136, the test apparatus controller 112 controls the test motor 118 according to the correction factor while the vehicle 102 is being controller according to the commanded velocity V. This is also indicated by arrow 126. The correction factor is applied to the wheel 106a via the coupling 120 by the test motor 118. Accordingly, the torque applied by the test motors 118 compensates for the rotational effects of the missing components of the vehicle 102 and the added components of the test apparatus 112. Accordingly, the control of the velocity by the velocity controller aligns with and is representative of a real-world testing situation. When the correction factor comprises or is combined with a load factor and/or a mass compensation factor the effect is that a real-world test is simulated and the vehicle may be tested as if it were travelling on a real road.

The process 130 involves the application of a torque at the test motors of the test apparatus rather than at the vehicle itself. It is important when performing measurements on the test apparatus to be able to operate the vehicle in conditions or according to commands that are as close to reality as possible. Therefore, the test apparatus 112 is used to compensate for effects both of the test apparatus itself and of missing components of the vehicle. Put another way, the test apparatus not only operates to correct effects it introduces but also acts to correct unwanted effects due to components of the vehicle.

By correcting in this way, the process 130 enables the two differing systems of the test apparatus 112 and the vehicle 102 to be connected together and to enable near-real-world testing. Conventionally, test apparatus 112 has been implemented using rollers, in which large, bulky machinery is used to emulate a road as closely as possible. Test apparatus for simulating road conditions that is connected directly to wheels may be used in some simulations but the vehicles that are tested are typically substantially dissimilar to those that will be used on the road and/or they are tested under conditions that are not similar to real roads. The improvements described above, based on the realization by that stiffness and damping effects can be represented by a torque correction value applied at a test motor, allows for the use of test apparatus such as the apparatus described above in more situations. Specifically, it also enables the use of the test apparatus with self-driving vehicles and vehicles incorporating velocity controllers such as single-pedal vehicles, thereby representing an important step in the development of these vehicles.

In some embodiments, the process 130 may be applied iteratively. Applying torque to a coupling and wheel may cause different effects related to their reactions to rotational force. Accordingly, refining the torque values applied by the test motors 118 by iteration may be performed to ensure that the output from the vehicle matches an expected output and/or adequately filters any unwanted effects. The torque values may be refined by determining changes due to the applied correction factor and based on the coefficients associated with the reaction of the components of the coupling to rotational force, and adjusting the correction factor to compensate for those changes.

In some embodiments of the invention, the test apparatus controller 112 may implement the process 130 by actively damping the velocity oscillations. Active damping may be applied by determining the output torque from the vehicle and applying the torque correction to the test apparatus as a phase offset of the output torque. By applying a phase offset correction factor that cancels out the output torque in this way, the effects of stiffness and damping of the components can be removed. In some embodiments, the output torque may be applied to achieve a velocity at the test apparatus that is a phase offset of the velocity oscillations output from the vehicle.

A phase offset may be determined experimentally. For example, while a phase offset of 180 degrees or $\pi$ radians would result in the inverse value of the torque/velocity output from the vehicle, latencies in the application of the offset may result in a further phase offset that causes further unwanted effects. Accordingly, a phase offset may be determined based on the measured output torque/velocity and other properties of the test apparatus and its coupling to the vehicle. The torque correction may be iteratively offset to determine a suitable offset. Other properties of the torque correction may also be iteratively or otherwise tuned to achieve a suitable inverse to counteract the unwanted effects.

In some embodiments, an expected torque output for the velocity command may be determined and compared with the determined torque output. Based on the difference between the expected and determined torque outputs, the correction factor may be determined and applied. The expected torque output may be determined based on one or more real-world measurements.

In some embodiments, systems such as antilock braking (ABS) or traction control may be deactivated to avoid unwanted activation during testing on the test apparatus.

Figure 3:
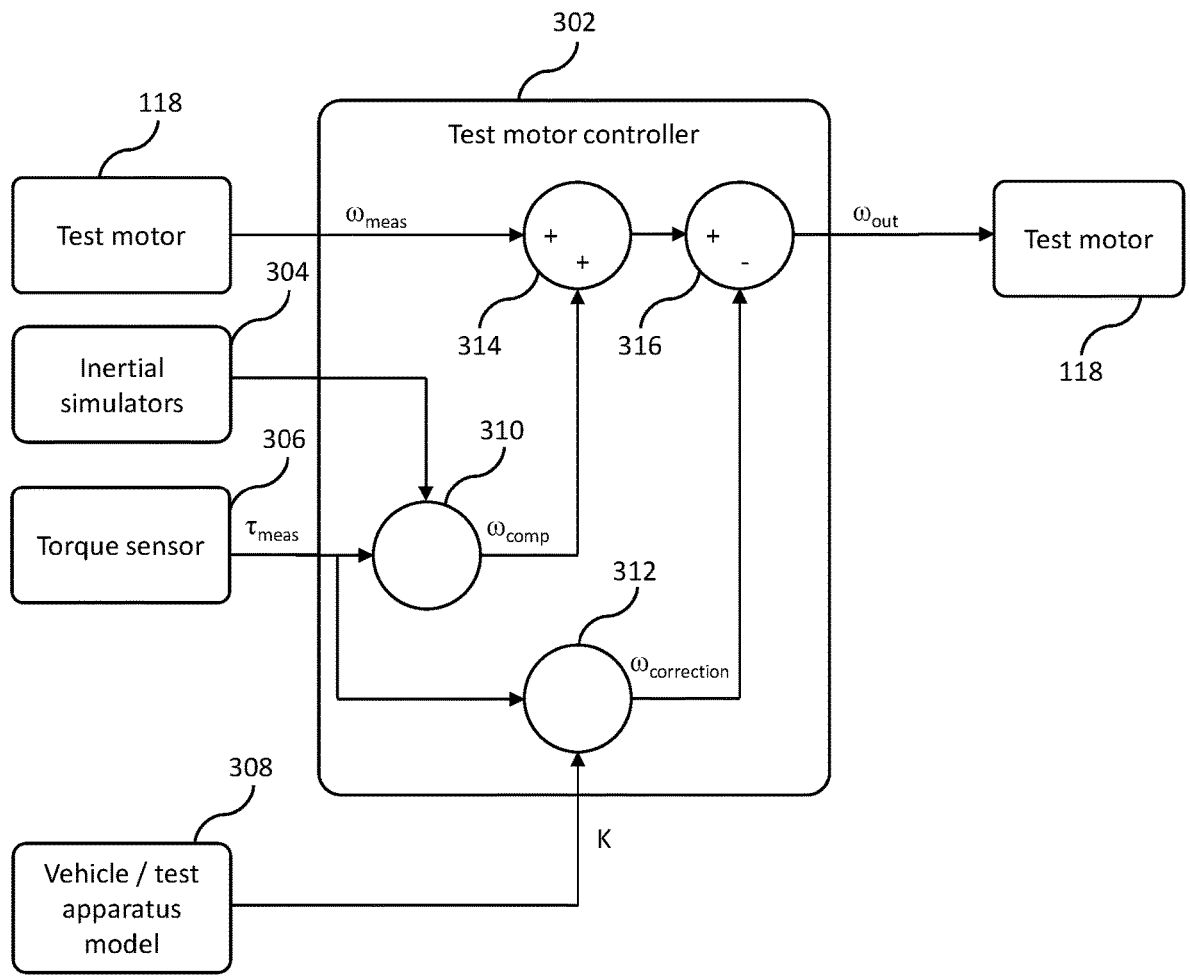
FIG. 3 is an illustration showing an example of a control system for controlling a test motor of a test apparatus.

An example of a control system diagram of a system for controlling the test motor is shown in FIG. 3. In FIG. 3, a test motor controller 302 is depicted. The test motor controller 302 may receive inputs from each of a test motor 118, inertial simulators 304, one or more torque sensors 306, and one or more models of the vehicle and/or test apparatus 308. The test motor controller 302 may be configured to determine a velocity command, $\omega_{out}$, based on a measured angular velocity of the test motor 118, which corresponds to the angular velocity of the wheels 106a of the test vehicle, $\omega_{meas}$, a velocity compensation factor which accounts for the load factor and mass compensation factor due to the inertia of the changed components of the vehicle and test apparatus, $\omega_{comp}$, and a determined velocity correction factor, as described above, $\omega_{correction}$.

To determine the velocity compensation, an output torque value, $\tau_{meas}$, may be received from the torque sensor 306, and one or more inertial simulators may provide a load torque, $\omega_{load}$. Together with three constants, comprising the total expected inertia of a vehicle on a road, $I_{sim}$, the inertia of the test apparatus, $I_{phys}$, and a timestep, $\Delta t$, the velocity compensation factor may be determined, at junction 310 in FIG. 3, as:

$$\Delta \omega_{comp} = \frac{\tau_{meas} - \tau_{load}}{I_{sim} - I_{phys}} \Delta t$$

The velocity correction factor $\omega_{correction}$, may be determined at junction 312 based on the output torque value, $\tau_{meas}$, and the aggregate spring constant K, as described above. At junction 312, a phase offset or lag compensation may also be applied to ensure that the correction factor is applied at the appropriate time.

Using these values determined at junctions 310 and 312, at junction 314, the compensation factor $\omega_{comp}$ may be added to the measured angular velocity at the test motor $\omega_{meas}$, and the correction factor may be subtracted at junction 316, to provide an output velocity command, according to which the test motors 118 are controlled.

Using such a controller, the angular velocity may be repeatedly measured and the output velocity command to the test motor may be iterated and adjusted to ensure that an appropriate correction is being applied.

Figure 4:
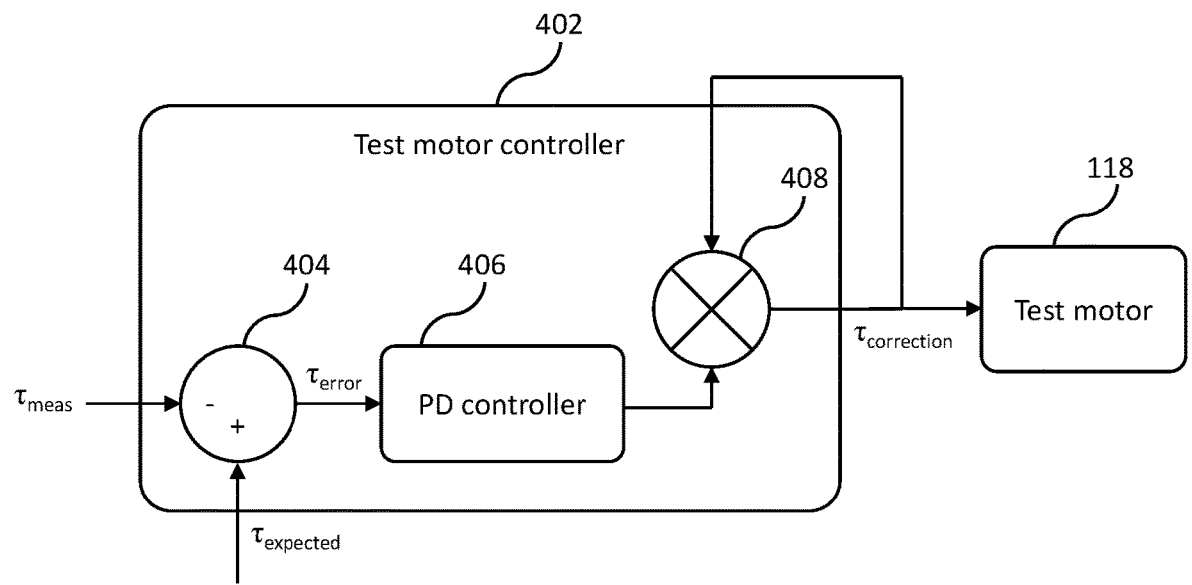
FIG. 4 is an illustration showing a further example of a control system for controlling a test motor of a test apparatus.

Another example control system diagram of a system for controlling each test motor is shown in FIG. 4. In FIG. 4, a test motor controller 402 is shown. The test motor controller forms part of the test apparatus controller 122. The test motor controller 402 receives inputs and determines a torque correction value, $\tau_{correction}$, which it outputs to a test motor 118. In the depicted embodiment, the torque correction value is determined by generating an error value for the output torque, $\tau_{meas}$, from the wheel compared with an expected torque value, $\tau_{expected}$. The expected torque value, $\tau_{expected}$, may be based, at least in part, by filtering the output torque value, $\tau_{meas}$. Accordingly, at a difference junction 404, the error value $\tau_{error}$, is determined to be the difference between the expected torque value and the output torque value. Thus, when the torque value rises above an expected torque value for the commanded velocity, the error is negative and the correction value is revised downwardly accordingly. To generate the correction factor value, the error value $\tau_{error}$ is passed through a proportional-derivative controller (PD controller) 406. The output may then be used to adjust the correction factor $\tau_{correction}$, as indicated at the junction 408.

By implementing this process, in which an expected torque is determined and compared to the output torque, the oscillations can be damped out using a correction factor value applied at the test motor. By introducing feedback to iterate and refine the correction factor value, the testing can ensure that stiffness and damping effects of missing components of the vehicle and/or components of the test apparatus are effectively filtered out. The use of a PD controller allows a spring-damper system to be mimicked at the test motor and therefore for the oscillations to be damped and a smooth acceleration and velocity achieved.

While the above relates to a test apparatus directly connected to a wheel, the methods and systems described herein may be applied to a rolling road test apparatus. While rolling road dynamometers are typically used with vehicles that have all tires and wheel hubs in place, the rotating components that form the rollers have an associated stiffness that varies under the loads of the vehicle and the test motors of the test apparatus. Accordingly, a correction factor may be applied to account for the stiffness effects, and therefore to emulate, as closely as possible, a real road.

In any of the above embodiments or examples, the measured values may be passed through one or more low-pass filters prior to their use in a determination of a compensation or correction factor to remove excess noise in the signal. In some examples, the expected torque value, $\tau_{expected}$, may be determined by filtering the output torque, $\tau_{meas}$.

Figure 5:
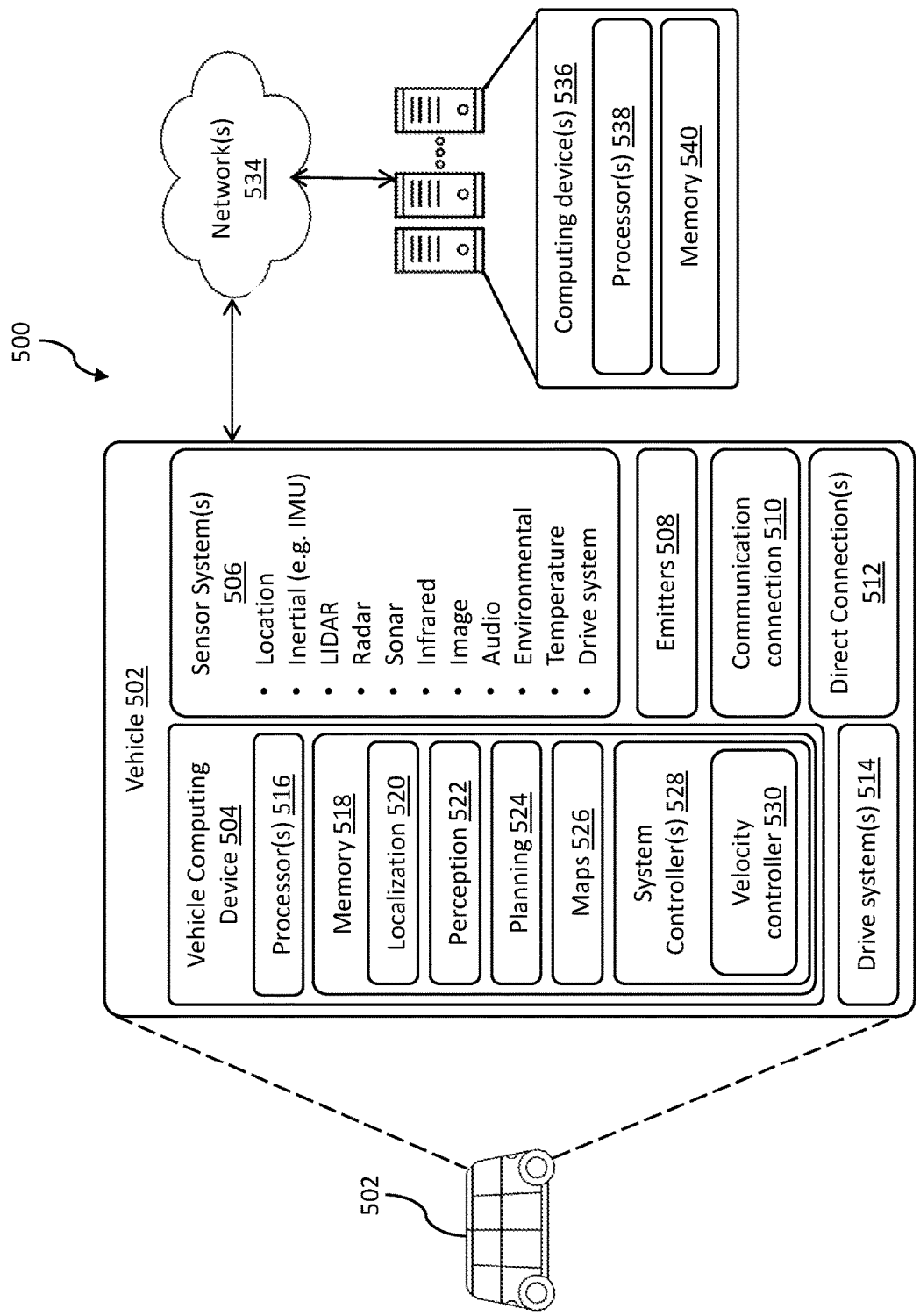
FIG. 5 depicts a block diagram of an example vehicle system.

FIG. 5 depicts a block diagram of an example system 500 for implementing the techniques described herein. In some instances, the system 500 may include a vehicle 502, which may correspond to the vehicle 102 of FIG. 1. In some instances, the vehicle 502 may be a self-driving or autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification. Moreover, in some instances, the techniques described herein may be usable by non-autonomous vehicles as well.

The vehicle 502 can include vehicle computing device(s) 504, one or more sensor systems 506, one or more communication connections 510, at least one direct connection 512 (e.g., for physically coupling the vehicle 502 to exchange data and/or to provide power), and one or more drive systems 514.

In some instances, the sensor(s) 506 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), drive system sensors for torque and/or velocity sensing etc. The sensor(s) 506 may include multiple instances of each of these or other types of sensors. For instance, the LIDAR sensors may include individual LIDAR sensors located at the corners, front, back, sides, and/or top of the vehicle 502. As another example, the cameras may include multiple cameras disposed at various locations about the exterior and/or interior of the vehicle 502. The sensor(s) 506 may provide input to the vehicle computing device(s) 504.

The vehicle 502 may also include the emitter(s) 508 for emitting light and/or sound, as described above. The emitter(s) 508 in this example may include interior audio and visual emitter(s) to communicate with passengers of the vehicle 502. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 508 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 502 may also include the communication connection(s) 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 508 may additionally or alternatively allow the vehicle 502 to communicate with other nearby computing device(s) (e.g., other nearby vehicles, traffic signals, etc.). The communication connection(s) 510 may additionally or alternatively enable the vehicle 502 to communicate with a computing device 536.

The vehicle computing device(s) 504 can include one or more processors 516 and memory 518 communicatively coupled with the one or more processors 516. In the illustrated example, the memory 518 of the vehicle computing device(s) 504 stores a localization component 520 perception component 522, a planning component 524, one or more maps 526, and one or more system controllers 528.

Though depicted in FIG. 5 as residing in memory 518 for illustrative purposes, it is contemplated that the localization component 520, the perception component 522, the planning component 524, the one or more maps 526, and the one or more system controllers 528 may additionally, or alternatively, be accessible to the vehicle 502 (e.g., stored remotely).

In some instances, the localization component 520 may be configured to receive data from the sensor system(s) 506 to determine a position and/or orientation of the vehicle 502 (e.g., one or more of an x-, y-, z-position, roll, pitch, or yaw). For example, the localization component 520 may include and/or request/receive a map 526 of an environment and may continuously determine a location and/or orientation of the autonomous vehicle within the map 526.

In some instances, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, unknown, etc.). In additional or alternative examples, the perception component 522 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some instances, the planning component 524 may determine a location of a user based on image data of an environment received from the user using, for example, bags of binary words with image-based features, artificial neural network, and the like. Further, the planning component 524 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 502 may stop to pick up a passenger. In at least one example, the planning component 524 may determine a pickup location based at least in part on determining a user identity (e.g., determined via image recognition or received as an indication from a user device, as discussed herein).

In some instances, the one or more maps 526 may be used by the vehicle 502 to navigate within the environment. For the purpose of this discussion, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, multiple maps 526 may be stored based on, for example, a characteristic (e.g., type of entity, time of day, day of week, season of the year, etc.). Storing multiple maps 526 may have similar memory requirements, but increase the speed at which data in a map may be accessed.

In at least one example, the vehicle computing device(s) 504 can include one or more system controllers 528, which may be a controller such as the controller 114 of FIG. 1. The system controller 528 can be configured to control steering, propulsion, braking, safety, emitters, communication, and other systems of the vehicle 502. The system controller(s) 528 can communicate with and/or control corresponding systems of the drive system(s) 514 and/or other components of the vehicle 502. The system controller may comprise a velocity controller 530 such as the velocity controller 116 of FIG. 1. The system controller(s) 528 may be communicatively coupled to one or more sensors of the vehicle sensor system(s) 506.

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive system with one or more other local or remote computing device(s).

In some examples, the vehicle 502 can send operational data, including raw or processed sensor data from the sensor system(s) 506, to one or more computing device(s) 536 via the network(s) 534. The one or more computing device(s) 536 may comprise one or more processors 538 and memory 540. The one or more computing devices 536 may be remote from the vehicle.

In some instances, aspects of some or all of the components discussed herein may include any models, algorithms, and/or machine learning algorithms. For example, the component(s) in the memory 518, 540 may be implemented as a neural network. As can be understood in the context of this disclosure, a neural network can utilize machine learning, which can refer to a broad class of such algorithms in which an output is generated based on learned parameters.

EXAMPLE CLAUSES

A: A system comprising: a test vehicle adapted for use with a test apparatus, the test vehicle comprising a drivetrain, the drivetrain including wheel hubs, each configured to receive a respective wheel, and a velocity controller configured to control a torque applied to drive the wheel hubs based on a velocity command; and a test apparatus to which the test vehicle is mounted, the test apparatus comprising a plurality of test motors, one or more sensors, and a controller, wherein each of the plurality of test motors is coupled to a respective one of the wheel hubs by a coupling, and wherein the controller is configured to independently control an output torque or output velocity of each of the plurality of test motors, wherein the controller controls the output torque or output velocity of each of the plurality of test motors by, for the wheel hubs: determining a load factor that represents a simulated road surface and a simulated drag force; determining a mass compensation factor that compensates for a torque difference when compared to a vehicle unconnected to the test apparatus, and wherein the mass compensation factor is based on a determined moment of inertia of components of the test apparatus and the test vehicle coupled to the test apparatus; applying the load factor and the mass compensation factor to one of the wheel hubs using a respective one of the test motors while the one of the wheel hubs is being controlled according to the velocity command; measuring, with the one or more sensors, an output torque from the wheel hub as a result of the velocity command; determining a torque correction factor that compensates for torque changes due to stiffnesses and damping of the components of the test apparatus and the test vehicle coupled to the test apparatus, based on the output torque from the wheel hub and a determined stiffness coefficient and damping coefficient of one or more of the components of the test apparatus and/or one or more components of the test vehicle whose operation is different due to the test vehicle being coupled to the test apparatus; and applying the torque correction factor to the wheel hub using the test motor while the wheel hub is being controlled according to the velocity command.

B: A system as paragraph A describes, wherein the controller further controls the output torque or output velocity of each of the plurality of test motors by: determining, based on the output torque from the wheel hub, a velocity oscillation in response to the constant velocity command; and determining the torque correction factor to actively damp the velocity oscillation.

C: A system as paragraph B describes, wherein the controller further controls the output torque or the output velocity of each of the plurality of test motors by: determining further torque changes in response to the torque correction factor due to stiffness and damping of the one or more components of the test apparatus and/or the one or more components of the test vehicle whose operation is different due to the test vehicle being coupled to the test apparatus; and adjusting the torque correction factor to compensate for the further torque changes.

D: A system as any one or more of paragraphs A to C describe, wherein the load factor, mass compensation factor, and the torque correction factor together simulate a physical vehicle travelling on a real road.

E: A method comprising: determining an output torque at a wheel of a vehicle mounted to a test apparatus comprising an external motor, the output torque being in response to a command; determining a correction factor based on the output torque and at least one coefficient associated with a reaction of a component of the vehicle and/or of the test apparatus to an applied torque at the vehicle; and controlling the external motor to apply the correction factor to the wheel of the vehicle.

F: A method as paragraph E describes, wherein the component comprises a component of the vehicle that operates differently due to the vehicle being mounted to the test apparatus.

G: A method as paragraph F describes, wherein the at least one coefficient comprises a stiffness coefficient and/or damping coefficient of the component.

H: A method as paragraph F or paragraph G describes, comprising: measuring a reaction of the component to one or more test commands on a physical or simulated vehicle that is unconnected to the test apparatus; and deriving the coefficient from the reaction.

I: A method as any one or more of paragraphs E to H describe, wherein the coefficient is associated with reaction of a component of the test apparatus, and wherein the reaction comprises a stiffness of the component of the test apparatus.

J: A method as any s paragraph I describes, wherein the external motor is connected to the wheel by a coupling, and wherein the component comprises at least part of the coupling.

K: A method as any one or more of paragraphs E to J describe, wherein the correction factor comprises a correction torque or a correction velocity.

L: A method as any one or more of paragraphs E to K describe, wherein controlling the external motor to apply the correction factor to the wheel of the vehicle comprises actively damping the output torque of the wheel using the correction factor.

M: A method as paragraph L describes, comprising determining a deviation of the output torque from an expected output torque based on the command, wherein the correction factor is determined based on the deviation.

N: A method as paragraph M describes, comprising: measuring an actual output torque from a wheel of a physical or simulated vehicle that is unconnected to the test apparatus in response to one or more test commands; and determining the expected output torque based on the actual torque output.

O: A method as any one or more of paragraphs E to N describe, comprising iterating the correction factor based on a reaction of the component to the correction factor.

P: A method as any one or more of paragraphs E to O describe, comprising: determining a load factor for controlling the external motor of the test apparatus; and determining the correction factor based on the load factor.

Q: A method as paragraph P describes, wherein the load factor represents at least one of: a simulated road condition; a simulated vehicle condition; or a simulated vehicle load.

R: A method as any one or more of paragraphs E to Q describe, comprising: determining a mass compensation factor for controlling the external motor of the test apparatus; and determining the correction factor based on the mass compensation factor.

S: A method as any one or more of paragraphs E to R describe, wherein the correction factor comprises a damping term and/or a filtering term.

T: One or more non-transitory computer-readable media storing instructions executable by one or more processors, wherein the instructions, when executed, cause the one or more processors to perform operations comprising: determining an output torque at a wheel of a vehicle mounted to a test apparatus comprising an external motor, the output torque being in response to a command; determining a correction factor based on the output torque and at least one coefficient associated with a reaction of a component of the vehicle and/or of the test apparatus to an applied torque at the vehicle; and controlling the external motor to apply the correction factor to the wheel of the vehicle.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

What is claimed is:

1. A system comprising:
a test vehicle adapted for use with a test apparatus, the test vehicle comprising a drivetrain, the drivetrain including wheel hubs, each configured to receive a respective wheel, and a velocity controller configured to control a torque applied to drive the wheel hubs based on a velocity command; and
a test apparatus to which the test vehicle is mounted, the test apparatus comprising a plurality of test motors, one or more sensors, and a controller, wherein each of the plurality of test motors is coupled to a respective one of the wheel hubs by a coupling, and wherein the controller is configured to independently control an output torque or output velocity of each of the plurality of test motors, wherein the controller controls the output torque or output velocity of each of the plurality of test motors by, for the wheel hubs:
determining a load factor that represents a simulated road surface and a simulated drag force;
determining a mass compensation factor that compensates for a torque difference when compared to a vehicle unconnected to the test apparatus, and wherein the mass compensation factor is based on a determined moment of inertia of components of the test apparatus and the test vehicle coupled to the test apparatus;
applying the load factor and the mass compensation factor to one of the wheel hubs using a respective one of the test motors while the one of the wheel hubs is being controlled according to the velocity command;
measuring, with the one or more sensors, an output torque from the wheel hub as a result of the velocity command;
determining a torque correction factor that compensates for torque changes due to stiffnesses and damping of the components of the test apparatus and the test vehicle coupled to the test apparatus, based on the output torque from the wheel hub and a determined stiffness coefficient and damping coefficient of one or more of the components of the test apparatus and/or one or more components of the test vehicle whose operation is different due to the test vehicle being coupled to the test apparatus; and
applying the torque correction factor to the wheel hub using the test motor while the wheel hub is being controlled according to the velocity command.

2. The system of claim 1, wherein the load factor, mass compensation factor, and the torque correction factor together simulate a physical vehicle travelling on a real road.

3. The system of claim 1, wherein the controller further controls the output torque or output velocity of each of the plurality of test motors by:
determining, based on the output torque from the wheel hub, a velocity oscillation in response to the constant velocity command; and
determining the torque correction factor to actively damp the velocity oscillation.

4. The system of claim 3, wherein the controller further controls the output torque or the output velocity of each of the plurality of test motors by:
determining further torque changes in response to the torque correction factor due to stiffness and damping of the one or more components of the test apparatus and/or the one or more components of the test vehicle whose operation is different due to the test vehicle being coupled to the test apparatus; and
adjusting the torque correction factor to compensate for the further torque changes.

5. A method comprising:
determining an output torque at a wheel of a vehicle mounted to a test apparatus comprising an external motor, the output torque being in response to a command;
determining a correction factor based on the output torque and at least one coefficient associated with a reaction of a component of the vehicle and/or of the test apparatus to an applied torque at the vehicle, wherein (i) the component comprises a component of the vehicle that operates differently due to the vehicle being mounted to the test apparatus, and (ii) the at least one coefficient comprises a stiffness coefficient and/or damping coefficient of the component; and
controlling the external motor to apply the correction factor to the wheel of the vehicle.

6. The method of claim 5, comprising:
measuring a reaction of the component to one or more test commands on a physical or simulated vehicle that is unconnected to the test apparatus; and
deriving the coefficient from the reaction.

7. The method of claim 5, wherein the correction factor comprises a correction torque or a correction velocity.

8. The method of claim 5, comprising iterating the correction factor based on a reaction of the component to the correction factor.

9. The method of claim 5, comprising:
determining a mass compensation factor for controlling the external motor of the test apparatus; and
determining the correction factor based on the mass compensation factor.

10. The method of claim 5, wherein the correction factor comprises a damping and/or a filtering.

11. The method of claim 5, wherein the coefficient is associated with reaction of a component of the test apparatus, and wherein the reaction comprises a stiffness of the component of the test apparatus.

12. The method of claim 11, wherein the external motor is connected to the wheel by a coupling, and wherein the component comprises at least part of the coupling.

13. The method of claim 5, comprising:
determining a load factor for controlling the external motor of the test apparatus; and
determining the correction factor based on the load factor.

14. The method of claim 13, wherein the load factor represents at least one of:
a simulated road condition;
a simulated vehicle condition; or
a simulated vehicle load.

15. The method of claim 5, wherein controlling the external motor to apply the correction factor to the wheel of the vehicle comprises actively damping the output torque of the wheel using the correction factor.

16. The method of claim 15, comprising determining a deviation of the output torque from an expected output torque based on the command, wherein the correction factor is determined based on the deviation.

17. The method of 16, comprising:
- measuring an actual output torque from a wheel of a physical or simulated vehicle that is unconnected to the test apparatus in response to one or more test commands; and
- determining the expected output torque based on the actual torque output.

18. One or more non-transitory computer-readable media storing instructions executable by one or more processors, wherein the instructions, when executed, cause the one or more processors to perform operations comprising:
- determining an output torque at a wheel of a vehicle mounted to a test apparatus comprising an external motor, the output torque being in response to a command;
- determining a correction factor based on the output torque and at least one coefficient associated with a reaction of a component of the vehicle and/or of the test apparatus to an applied torque at the vehicle, wherein (i) the component comprises a component of the vehicle that operates differently due to the vehicle being mounted to the test apparatus, and (ii) the at least one coefficient comprises a stiffness coefficient and/or damping coefficient of the component; and
- controlling the external motor to apply the correction factor to the wheel of the vehicle.

* * * * *